(12) United States Patent
Shi et al.

(10) Patent No.: US 8,798,569 B2
(45) Date of Patent: Aug. 5, 2014

(54) CHANNEL ESTIMATION METHOD AND DEVICE IN A MULTI-ANTENNA SYSTEM

(75) Inventors: Fan Shi, Shenzhen (CN); Jiahai Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 293 days.

(21) Appl. No.: 13/504,484

(22) PCT Filed: Jul. 1, 2010

(86) PCT No.: PCT/CN2010/074890
§ 371 (c)(1),
(2), (4) Date: Apr. 27, 2012

(87) PCT Pub. No.: WO2010/145621
PCT Pub. Date: Dec. 23, 2010

(65) Prior Publication Data
US 2012/0213115 A1    Aug. 23, 2012

(30) Foreign Application Priority Data

Oct. 28, 2009    (CN) .......................... 2009 1 0209158

(51) Int. Cl.
*H04W 24/02* (2009.01)
*H04B 1/10* (2006.01)

(52) U.S. Cl.
USPC ............................ 455/296; 455/272; 370/252

(58) Field of Classification Search
USPC ............. 455/67.13, 114.2, 272, 296; 370/252
See application file for complete search history.

(56) References Cited

U.S. PATENT DOCUMENTS

| 7,154,960 B2* | 12/2006 | Liu et al. ........................ 375/267 |
| 2004/0165558 A1* | 8/2004 | Ling et al. ..................... 370/334 |
| 2004/0171385 A1* | 9/2004 | Haustein et al. .............. 455/450 |
| 2009/0257521 A1* | 10/2009 | Kent et al. ..................... 375/260 |

FOREIGN PATENT DOCUMENTS

| CN | 1561013 A | 1/2005 |
| CN | 1688143 A | 10/2005 |
| CN | 1859343 A | 11/2006 |

\* cited by examiner

*Primary Examiner* — Blane J Jackson
(74) *Attorney, Agent, or Firm* — Bright IP Law Offices

(57) ABSTRACT

The present invention discloses a channel estimation method and device in a multi-antenna system. The method includes: obtaining the original channel estimation value of each array element of an array antenna for each uplink user received by the antenna; converting them into a channel estimation matrix; dividing the channel estimation matrix into an amplitude matrix and a phase matrix; grouping the elements of each array element at the same tap location in the amplitude matrix together for signal transformation processing and performing transform domain noise reduction to the high-frequency portion of the obtained transform domain data; inversely transforming the noise-reduced data to a noise-reduced amplitude matrix; and combining the noise-reduced amplitude matrix with the phase matrix into a restored channel estimation matrix, wherein the amplitude of each channel estimation value of the restored channel estimation matrix has undertaken a multi-antenna transform domain noise reduction process.

16 Claims, 2 Drawing Sheets

CHANNEL ESTIMATION METHOD AND DEVICE IN A MULTI-ANTENNA SYSTEM

CROSS REFERENCE TO RELATED APPLICATIONS

This application is the U.S. National Stage of International Patent Application No. PCT/CN2010/074890 filed on Jul. 1, 2010, which claims priority to Chinese Patent Application No. 200910209158.9 filed on Oct. 28, 2009. Both the PCT Application and Chinese Application are hereby incorporated by reference in their entirety.

FIELD OF THE INVENTION

The disclosure relates to a wireless communication technology, in particular to a channel estimation method and device in a multi-antenna system.

BACKGROUND OF THE INVENTION

Channel estimation algorithm in a wireless communication system uses a set of known sequences to perform channel impulse response estimation, and is essential to such key technology as reception and detection, and transmission and preprocessing. An ideal channel estimation is the one having nothing to do with noise, reflecting its own characteristics of a wireless channel. The original channel estimation is the one obtained according to the channel estimation algorithm after the channel estimation sequence passes through the wireless channel and reaches a receiver, but before signal detection. Compared with the ideal channel estimation, the original channel estimation is affected by both interference and noise and has a certain estimation error, which will affect the performance of such algorithms as signal detection and transmission preprocessing. Therefore, a further postprocessing is required after the original channel estimation is obtained to suppress the interference and noise in the channel estimation result and reduce the estimation error.

In the conventional art of a channel estimation postprocessing process of a Time Division-Synchronous Code Division Multiple Access (TD-SCDMA) system, the noise tap and small signal tap not exceeding the threshold in a user channel estimation window are removed by a fixed or an adaptive power threshold, so as to improve the channel estimation precision of the communication system. However, the defects that remain in the noise residuals in the channel estimation signal tap cannot be estimated and removed, resulting in a poor channel estimation precision.

SUMMARY OF THE INVENTION

The disclosure provides a channel estimation method and device in a multi-antenna system, in order to reduce the influence of noise on the channel estimation.

In one aspect, the disclosure provides a channel estimation method in a multi-antenna system, including:

for each uplink user received by a base station array antenna, obtaining an original channel estimation value for each array element of the array antenna;

generating a channel estimation matrix using the obtained original channel estimation values, wherein the channel estimation values associated with each array element form a respective row vector of the channel estimation matrix, and the channel estimation values of respective array elements corresponding to a location of each channel estimation tap form a respective column vector of the channel estimation matrix;

dividing the channel estimation matrix into a channel estimation amplitude matrix and a channel estimation phase matrix;

grouping, in the channel estimation amplitude matrix, the channel estimation values associated with the respective array elements at one corresponding tap location together for signal transformation processing;

applying a transform domain noise reduction to a high-frequency portion of transform domain data obtained by the signal transformation processing;

obtaining a noise-reduced channel estimation amplitude matrix by applying an inverse transform to the noise-reduced transform domain data; and combining the noise-reduced channel estimation amplitude matrix with the channel estimation phase matrix into a restored channel estimation matrix, wherein the amplitude of each channel estimation value of the restored channel estimation matrix has undertaken a multi-antenna transform domain noise reduction process.

Preferably, the method further includes:

applying a channel estimation power threshold postprocessing to a tap power of a respective channel estimation value of the restored channel estimation matrix.

Preferably, the step of applying a transform domain noise reduction to a high-frequency portion of transform domain data obtained by the signal transformation processing further includes setting the high-frequency portion of the transform domain data to zero.

Preferably, the step of setting high-frequency portion of the transform domain data to zero further includes: setting the elements in the last m rows of the transform domain data to zero, wherein m is less than a sum of the antennas and obtained through simulation.

Preferably, the signal transformation processing is one selected from the group consisting of: Discrete Fourier Transformation (DFT), Discrete Cosine Transformation (DCT) and Discrete Wavelet Transformation (DWT).

The disclosure further provides a channel estimation device in a multi-antenna system, including:

a matrix module which is configured to, for each uplink user received by a base station array antenna, first obtain an original channel estimation value for each array element of the array antenna, and then generate a channel estimation matrix using the obtained original channel estimation values, wherein the channel estimation values associated with each array element form a respective row vector of the channel estimation matrix, and the channel estimation values of respective array elements corresponding to a location of each channel estimation tap form a respective column vector of the channel estimation matrix;

a dividing module which is configured to divide the channel estimation matrix into a channel estimation amplitude matrix and a channel estimation phase matrix;

a transformation module which is configured to group, in the channel estimation amplitude matrix, the channel estimation values associated with the respective array elements at one corresponding tap location together for signal transformation processing;

a noise reduction module which is configured to apply a transform domain noise reduction to a high-frequency portion of transform domain data obtained by the signal transformation processing;

an inverse transformation module which is configured to obtain a noise-reduced channel estimation amplitude matrix by applying an inverse transform to the noise-reduced transform domain data; and a restoring module which is configured to combine the noise-reduced channel estimation amplitude matrix with the channel estimation phase matrix into a restored channel estimation matrix, wherein the amplitude of each channel estimation value of the restored channel estimation matrix has undertaken a multi-antenna transform domain noise reduction process.

Preferably, the device further includes:

a postprocessing module which is configured to apply a channel estimation power threshold postprocessing to a tap power of a respective channel estimation value of the restored channel estimation matrix.

Preferably, the noise reduction module is further configured to set the high-frequency portion of the transform domain data to zero when applying the transform domain noise reduction to the high-frequency portion of the transform domain data.

Preferably, the noise reduction module is further configured to set the elements in the last m rows of the transform domain data to zero, wherein m is less than a sum of the antennas and obtained through simulation.

Preferably, the transformation module is further configured to perform a signal transformation processing selected from the group consisting of: Discrete Fourier Transformation (DFT), Discrete Cosine Transformation (DCT) and Discrete Wavelet Transformation (DWT).

The disclosure has the following advantages:

Compared with the conventional art, the technical solution provided in the embodiments of the disclosure performs original channel estimation according to the uplink signal received by a base station terminal array antenna, and suppresses the noise on a signal tap in the channel estimation by multi-antenna transform domain noise reduction, so as to improve the channel estimation precision and further to improve the whole performance of the multi-antenna system.

DETAILED DESCRIPTION OF THE EMBODIMENTS

The inventor has noted in the invention process that: array antennas are one kind of multi-antenna system, array elements of the array antenna have strong correlation in received signal, but they are independent and has weak correlation in terms of noise, thus noise reduction can be performed on the channel estimation of each array element according to such feature of the array antenna, so as to further remove the noise influence on the channel estimation signal tap and improve the channel estimation precision of the system and the system performance. Therefore, one embodiment of the disclosure provides a solution suitable for the multi-antenna system to reduce the noise influence of the channel estimation, in order to improve the performance of the communication system. The specific embodiment of the disclosure will be described below in conjunction with the drawings.

Figure 1:
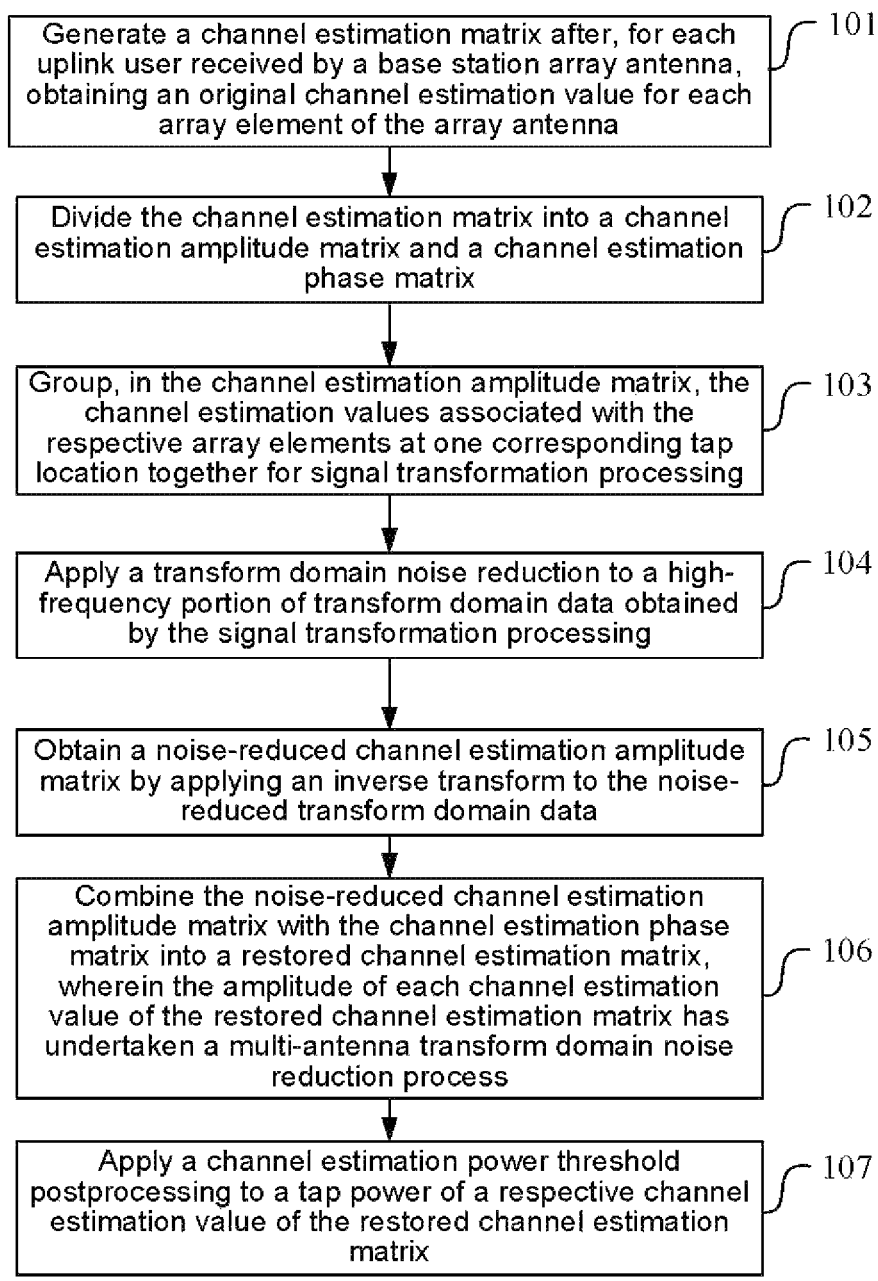
FIG. 1 is a diagram showing the implementation flow of a channel estimation method in a multi-antenna system in one embodiment of the disclosure.

FIG. 1 is a diagram showing the implementation flow of a channel estimation method in a multi-antenna system, as shown, the method may include:

S101: Generate a channel estimation matrix after, for each uplink user received by a base station array antenna, obtaining an original channel estimation value for each array element of the array antenna.

The channel estimation matrix may be configured such that the channel estimation values associated with each array element form a respective row vector of the channel estimation matrix, and the channel estimation values of respective array elements corresponding to a location of each channel estimation tap form a respective column vector of the channel estimation matrix.

In implementation, the original channel estimation value of each array element of each uplink user received by a base station array antenna is obtained to generate a channel estimation matrix, the row vector of which matrix represents the channel estimation value on an array element, and the column vector of which matrix represents the channel estimation value of each antenna at a channel estimation tap location.

S102: Divide the channel estimation matrix into a channel estimation amplitude matrix and a channel estimation phase matrix.

S103: Group, in the channel estimation amplitude matrix, the channel estimation values associated with the respective array elements at one corresponding tap location together for signal transformation processing.

In implementation, the obtained user channel estimation matrix is divided into a channel estimation amplitude matrix and a channel estimation phase matrix; the elements of each array element at the same tap location in the channel estimation amplitude matrix are grouped together for signal transformation processing, that is, the multi-antenna data is transformed to obtain the data of the channel estimation amplitude in the multi-antenna transform domain, the signal transformation here may include DFT, DCT, DWT and other ways, correspondingly, the transform domain corresponds to a DFT domain, a DCT domain, a DWT domain and other transform domains respectively.

S104: Apply a transform domain noise reduction to a high-frequency portion of transform domain data obtained by the signal transformation processing.

In implementation, the transform domain noise reduction for the data of high-frequency portion of transform domain data may be: the data of high-frequency portion of the transform domain data is set to zero.

When the data of high-frequency portion of the transform domain data obtained by signal transformation processing is set to zero, the elements in the last m rows of the obtained transform domain data may be set to zero, where m is less than the sum of the antennas and obtained by simulation.

S105: Obtain a noise-reduced channel estimation amplitude matrix by applying an inverse transform to the noise-reduced transform domain data.

In implementation, the data of high-frequency portion of the obtained transform domain data is set to zero for transform domain noise reduction; and then the data set to zero is inversely transformed to obtain channel estimation amplitude matrix on which multi-antenna transform domain noise reduction is performed.

S106: Combine the noise-reduced channel estimation amplitude matrix with the channel estimation phase matrix into a restored channel estimation matrix, wherein the amplitude of each channel estimation value of the restored channel estimation matrix has undertaken a multi-antenna transform domain noise reduction process.

In implementation, the method may further include:

S107: Apply a channel estimation power threshold post-processing to a tap power of a respective channel estimation value of the restored channel estimation matrix.

An embodiment is further used for description below, with DCT, and DWT as examples for description.

In the first embodiment of the disclosure, with TD-SCDMA 8-unit linear array as an example, the TD-SCDMA multi-antenna DCT channel estimation may be processed in the following ways:

1. Channel estimation is performed on the training sequence signal received by 8 uplink antennas of a base station to obtain the original channel estimation of each antenna array element:

$$\hat{h}_i^{ka} = IFFT\left(\frac{FFT(e_{mid}^{ka})}{FFT(mid)}\right)$$

$$i = 1, 2, \ldots, 128$$

where $ka \in 1 \ldots Ka$, ka is the antenna serial number, Ka is the antenna quantity of the base station array; in the embodiment, Ka=8; i represents the serial number of the channel estimation time tap, the original channel estimation length is 128, and i=1, 2, . . . , 128; $e_{mid}^{ka}$ represents the training sequence signal received on the kath antenna; mid represents the basic Midamble code; and $\hat{h}_i^{ka}$ represents the original channel estimation of the ith time tap on the kath antenna.

2. The channel impulse response in the channel estimation window of the user k is intercepted from the original channel estimation value, suppose the length W of the channel estimation window of the user k equals 16 in the embodiment, one obtains 8*16 multi-antenna channel estimation matrix $\hat{H}_k$ of the user k, as follows:

$$\hat{H}_k = \begin{bmatrix} \hat{h}_1^1 & \hat{h}_2^1 & \ldots & \hat{h}_W^1 \\ \hat{h}_1^2 & \hat{h}_2^2 & \ldots & \hat{h}_W^2 \\ \vdots & \vdots & \ddots & \vdots \\ \hat{h}_1^{Ka} & \hat{h}_2^{Ka} & \ldots & \hat{h}_W^{Ka} \end{bmatrix}$$

where the elements of the multi-antenna channel estimation matrix $\hat{H}_k$ of the user k are $\hat{h}_w^{ka}$, ka=1, 2, . . . , Ka, $^{ka}$ is the antenna serial number, and Ka is the antenna quantity of the base station array; w=1, 2, . . . , W, and w represents the serial number of the time tap in the channel estimation window; and $\hat{h}_w^{ka} = \hat{a}_w^{ka} \cdot \exp(j\hat{\theta}_w^{ka})$, one can divide $\hat{H}_k$ into the amplitude matrix $\hat{A}_k$ and phase matrix $\hat{\Theta}_k$ to obtain:

$$\hat{A}_k = \begin{bmatrix} \hat{a}_1^1 & \hat{a}_2^1 & \ldots & \hat{a}_W^1 \\ \hat{a}_1^2 & \hat{a}_2^2 & \ldots & \hat{a}_W^2 \\ \vdots & \vdots & \ddots & \vdots \\ \hat{a}_1^{Ka} & \hat{a}_2^{Ka} & \ldots & \hat{a}_W^{Ka} \end{bmatrix},$$

-continued $$\hat{\Theta}_k = \begin{bmatrix} \exp(j\hat{\theta}_1^1) & \exp(j\hat{\theta}_2^1) & \ldots & \exp(j\hat{\theta}_W^1) \\ \exp(j\hat{\theta}_1^2) & \exp(j\hat{\theta}_2^2) & \ldots & \exp(j\hat{\theta}_W^2) \\ \vdots & \vdots & \ddots & \vdots \\ \exp(j\hat{\theta}_1^{Ka}) & \exp(j\hat{\theta}_2^{Ka}) & \ldots & \exp(j\hat{\theta}_W^{Ka}) \end{bmatrix}.$$

DCT is performed on each column of the amplitude matrix at Ka point respectively, that is, DCT is performed on the same time tap ($^w$tap) data of the amplitude matrix on each antenna array element, the DCT is performed on different antennas, so it is called space domain DCT:

$$\hat{y}_w^{ka} = w(ka-1) \sum_{n=0}^{Ka-1} \hat{a}_w^{n+1} \cos\frac{\pi(2n+1)(ka-1)}{2Ka}$$

$$ka = 1, 2\ldots, Ka$$

where $$w(ka-1) = \begin{cases} 1/\sqrt{Ka} & ka-1 = 0 \\ \sqrt{2/Ka} & ka-1 \neq 0 \end{cases}$$

$\hat{a}_w^{n+1}$ is the channel estimation amplitude value of the (n+1)th antenna array element of the wth time tap, and Ka is the quantity of the array elements of the base station receiving antenna.

Similarly, space domain DCT is performed on all the time tap column vectors of the channel estimation amplitude matrix $\hat{A}_k$ to obtain the amplitude matrix $\hat{Y}_k$ on which the space domain DCT is performed.

$$\hat{Y}_k = \begin{bmatrix} \hat{y}_1^1 & \hat{y}_2^1 & \ldots & \hat{y}_W^1 \\ \hat{y}_1^2 & \hat{y}_2^2 & \ldots & \hat{y}_W^2 \\ \vdots & \vdots & \ddots & \vdots \\ \hat{y}_1^{Ka} & \hat{y}_2^{Ka} & \ldots & \hat{y}_W^{Ka} \end{bmatrix}$$

3. The elements in the last m rows in the amplitude matrix $\hat{Y}_k$ on which space domain DCT is performed are set to zero (m<Ka), to obtain a new amplitude matrix $\hat{Y}_k^1$.

$$\hat{Y}_k' = \begin{bmatrix} \hat{y}_1'^1 & \hat{y}_2'^1 & \ldots & \hat{y}_W'^1 \\ \hat{y}_1'^2 & \hat{y}_2'^2 & \ldots & \hat{y}_W'^2 \\ \vdots & \vdots & \ddots & \vdots \\ \hat{y}_1'^{Ka} & \hat{y}_2'^{Ka} & \ldots & \hat{y}_W'^{Ka} \end{bmatrix}$$

where $$\hat{y}_w'^{Ka} = \begin{cases} \hat{y}_w'^{Ka} & ka \leq Ka - m \\ 0 & ka > Ka - m \end{cases}$$

IDCT is further performed on each column of the new amplitude matrix $\hat{Y}_k^1$: at Ka point.

$$\hat{a}_w^{ka} = \sum_{n=0}^{Ka-1} w(n)\hat{y}_w'^{n+1} \cos\frac{\pi(2(ka-1)+1)n}{2Ka}$$

$ka = 1, 2\ldots, Ka$ where $$w(n) = \begin{cases} 1/\sqrt{Ka} & n = 0 \\ \sqrt{2/Ka} & n \neq 0 \end{cases}$$

m can be selected by simulation.

Similarly, space domain IDCT is performed on the time tap column of the channel amplitude matrix $\hat{Y}_k^1$ on which DCT is performed and which is set to zero to obtain the amplitude matrix $\hat{Y}_k^1$ on which space domain IDCT is performed.

4. The phase information of the amplitude matrix data $\hat{A}_k^1$ on which IDCT is performed is restored to obtain the channel estimation value $\hat{H}_k^1$ on which space domain OCT is performed:

$$\hat{H}_k^1 = \hat{A}_k^1 \cdot \hat{\Theta}_k$$

where "·" represents matrix dot product.

5. Channel postprocessing is performed on the channel estimation on which space domain DCT is performed.

In the second embodiment of the disclosure, with TD-SCDMA 8 unit linear array as an example, the TD-SCDMA multi-antenna DWT channel estimation method may be implemented in the following ways:

1. Channel estimation is performed on the training sequence signal received by 8 base station uplink antennas to obtain the original channel estimation of each antenna array element:

$$\hat{h}_i^{ka} = IFFT\left(\frac{FFT(e_{mid}^{ka})}{FFT(mid)}\right)$$

$i = 1, 2, \ldots, 128$ where $ka \in 1 \ldots Ka$, ka is the antenna serial number, Ka is the antenna quantity of the base station array; in the embodiment, Ka=8; i represents the serial number of the channel estimation time tap, the original channel estimation length is 128, and i=1, 2, ..., 128; $e_{mid}^{ka}$ represents the training sequence signal received on the kath antenna; mid represents the basic Midamble code; and $\hat{h}_i^{ka}$ represents the original channel estimation of the ith time tap on the kath antenna.

2. The channel impulse response in the channel estimation window of the user k is intercepted from the original channel estimation, suppose the length W of the channel estimation window of the user k in the embodiment equals 16, one obtains 8*16 multi-antenna channel estimation matrix $\hat{H}_k$ of the user k, as follows:

$$\hat{H}_k = \begin{bmatrix} \hat{h}_1^1 & \hat{h}_2^1 & \ldots & \hat{h}_W^1 \\ \hat{h}_1^2 & \hat{h}_2^2 & \ldots & \hat{h}_W^2 \\ \vdots & \vdots & \ddots & \vdots \\ \hat{h}_1^{Ka} & \hat{h}_2^{Ka} & \ldots & \hat{h}_W^{Ka} \end{bmatrix}$$

where the elements of the multi-antenna channel estimation matrix $\hat{H}_k$ of the user k are $\hat{h}_w^{ka}$, ka=1, 2, ..., Ka; w=1, 2, ... W, represents the serial number of the time tap in the channel estimation window; and $\hat{h}_w^{ka} = \hat{a}_w^{ka} \cdot \exp(j\hat{\theta}_w^{ka})$, one can divide $\hat{H}_k$ into the amplitude matrix $\hat{A}_k$ and phase matrix $\hat{\Theta}_k$ to obtain:

$$\hat{A}_k = \begin{bmatrix} \hat{a}_1^1 & \hat{a}_2^1 & \ldots & \hat{a}_W^1 \\ \hat{a}_1^2 & \hat{a}_2^2 & \ldots & \hat{a}_W^2 \\ \vdots & \vdots & \ddots & \vdots \\ \hat{a}_1^{Ka} & \hat{a}_2^{Ka} & \ldots & \hat{a}_W^{Ka} \end{bmatrix},$$

$$\hat{\Theta}_k = \begin{bmatrix} \exp(j\hat{\theta}_1^1) & \exp(j\hat{\theta}_2^1) & \ldots & \exp(j\hat{\theta}_W^1) \\ \exp(j\hat{\theta}_1^2) & \exp(j\hat{\theta}_2^2) & \ldots & \exp(j\hat{\theta}_W^2) \\ \vdots & \vdots & \ddots & \vdots \\ \exp(j\hat{\theta}_1^{Ka}) & \exp(j\hat{\theta}_2^{Ka}) & \ldots & \exp(j\hat{\theta}_W^{Ka}) \end{bmatrix}.$$

DWT is performed on each column of the amplitude matrix at Ka point, that is, DWT is performed on the data of the same time tap ("tap") of the amplitude matrix on each antenna array element, the DWT is performed on different antennas, so it is called space domain DWT, which is represented by Haar wavelet transform in the embodiment:

$$B_{Haar} = \begin{bmatrix} \frac{1}{\sqrt{8}} & \frac{1}{\sqrt{8}} & \frac{1}{\sqrt{8}} & \frac{1}{\sqrt{8}} & \frac{1}{\sqrt{8}} & \frac{1}{\sqrt{8}} & \frac{1}{\sqrt{8}} & \frac{1}{\sqrt{8}} \\ \frac{1}{\sqrt{8}} & \frac{1}{\sqrt{8}} & \frac{1}{\sqrt{8}} & \frac{1}{\sqrt{8}} & \frac{-1}{\sqrt{8}} & \frac{-1}{\sqrt{8}} & \frac{-1}{\sqrt{8}} & \frac{-1}{\sqrt{8}} \\ \frac{1}{2} & \frac{1}{2} & \frac{-1}{2} & \frac{-1}{2} & 0 & 0 & 0 & 0 \\ 0 & 0 & 0 & 0 & \frac{1}{2} & \frac{1}{2} & \frac{-1}{2} & \frac{-1}{2} \\ \frac{1}{\sqrt{2}} & \frac{-1}{\sqrt{2}} & 0 & 0 & 0 & 0 & 0 & 0 \\ 0 & 0 & \frac{1}{\sqrt{2}} & \frac{-1}{\sqrt{2}} & 0 & 0 & 0 & 0 \\ 0 & 0 & 0 & 0 & \frac{1}{\sqrt{2}} & \frac{-1}{\sqrt{2}} & 0 & 0 \\ 0 & 0 & 0 & 0 & 0 & 0 & \frac{1}{\sqrt{2}} & \frac{-1}{\sqrt{2}} \end{bmatrix}$$

where $B_{Haar}$ represents the Haar wavelet transform of 8 points.

$$\hat{Y}_k = \begin{bmatrix} \hat{y}_1^1 & \hat{y}_2^1 & \ldots & \hat{y}_W^1 \\ \hat{y}_1^2 & \hat{y}_2^2 & \ldots & \hat{y}_W^2 \\ \vdots & \vdots & \ddots & \vdots \\ \hat{y}_1^{Ka} & \hat{y}_2^{Ka} & \ldots & \hat{y}_W^{Ka} \end{bmatrix} = B_{Haar} * \hat{A}_k$$

The amplitude matrix $\hat{Y}_k$ on which DWT is performed is obtained.

3. The elements in the last m rows in the amplitude matrix $\hat{Y}_k$ which the space domain DWT is performed are set to zero (m<Ka), to obtain a new amplitude matrix $\hat{Y}_k^1$.

$$\hat{Y}_k' = \begin{bmatrix} \hat{y}_1'^1 & \hat{y}_2'^1 & \ldots & \hat{y}_W'^1 \\ \hat{y}_1'^2 & \hat{y}_2'^2 & \ldots & \hat{y}_W'^2 \\ \vdots & \vdots & \ddots & \vdots \\ \hat{y}_1'^{Ka} & \hat{y}_2'^{Ka} & \ldots & \hat{y}_W'^{Ka} \end{bmatrix}$$

-continued where $$\hat{y}_w^{\prime Ka} = \begin{cases} \hat{y}_w^{\prime Ka} & ka \leq Ka - m \\ 0 & ka > Ka - m \end{cases}$$

IDWT is further performed on each column of the new amplitude matrix $\hat{Y}_k^1$ at Ka point respectively:

$$\hat{A}_k^1 = \hat{Y}_k^1 * B_{Haar}^T$$

The amplitude matrix $\hat{A}_k^1$ on which IDWT is performed is obtained, where $B_{Haar}^T$ represents the transposition of $B_{Haar}$.

4. The phase information of the data of the amplitude matrix $\hat{A}_k^1$ on which the IDWT is performed is restored to obtain the channel estimation value $\hat{H}_k^1$ on which the space domain DWT is performed:

$$\hat{H}_k^1 = \hat{A}_k^1 \cdot \hat{\Theta}_k$$

where "." represents matrix dot product.

5. Channel postprocessing is performed on the channel estimation on which space domain DWT is performed.

Based on the same inventive concept, one embodiment of the disclosure further provides a channel estimation device in a multi-antenna system, which has the similar principle of solving problem to that of the channel estimation method in the multi-antenna system, so the implementation of the device can refer to that of the method, and no further description is given to repeated contents.

Figure 2:
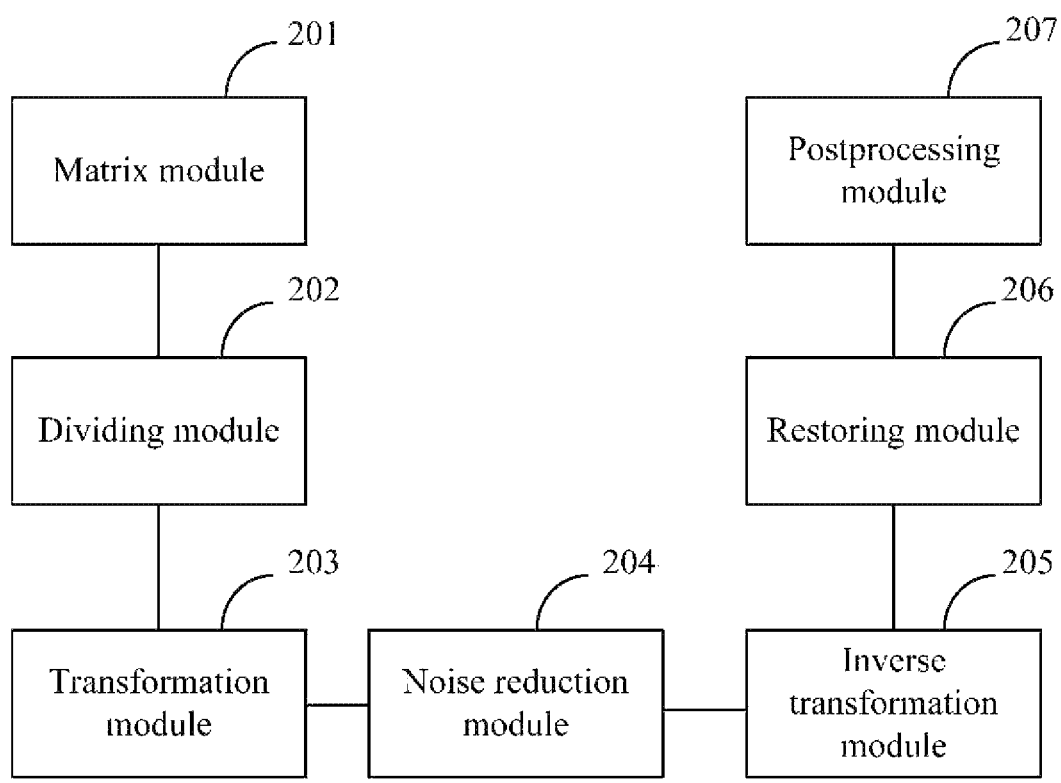
FIG. 2 is a diagram showing the structure of a channel estimation device in a multi-antenna system in one embodiment of the disclosure.

FIG. 2 is a diagram showing the structure of a channel estimation device in a multi-antenna system, as shown, the device may include:

a matrix module 201 which is configured to for each uplink user received by a base station array antenna, first obtain an original channel estimation value for each array element of the array antenna, and then generate a channel estimation matrix using the obtained original channel estimation values, wherein the channel estimation values associated with each array element form a respective row vector of the channel estimation matrix, and the channel estimation values of respective array elements corresponding to a location of each channel estimation tap form a respective column vector of the channel estimation matrix;

a dividing module 202 which is configured to divide the channel estimation matrix into a channel estimation amplitude matrix and a channel estimation phase matrix a transformation module 203 which is configured to group, in the channel estimation amplitude matrix, the channel estimation values associated with the respective array elements at one corresponding tap location together for signal transformation processing;

a noise reduction module 204 which is configured to apply a transform domain noise reduction to a high-frequency portion of transform domain data obtained by the signal transformation processing;

an inverse transformation module 205 which is configured to obtain a noise-reduced channel estimation amplitude matrix by applying an inverse transform to the noise-reduced transform domain data; and a restoring module 206 which is configured to combine the noise-reduced channel estimation amplitude matrix with the channel estimation phase matrix into a restored channel estimation matrix, wherein the amplitude of each channel estimation value of the restored channel estimation matrix has undertaken a multi-antenna transform domain noise reduction process.

In implementation, the device may further include:

a postprocessing module 207 which is configured to apply a channel estimation power threshold postprocessing to a tap power of a respective channel estimation value of the restored channel estimation matrix.

In the implementation, the noise reduction module 204 may be further configured to set the high-frequency portion of the transform domain data to zero when applying the transform domain noise reduction to the high-frequency portion of the transform domain data.

In the implementation, the noise reduction module 204 may be further configured to set the elements in the last m rows of the transform domain data to zero, wherein m is less than a sum of the antennas and obtained through simulation.

In the implementation, the transformation module 203 may be further configured to perform a signal transformation processing selected from the group consisting of: Discrete Fourier Transformation (DFT), Discrete Cosine Transformation (DCT) and Discrete Wavelet Transformation (DWT).

For the convenience of description, each part of the device is divided into various modules or units according to the functions to be described respectively. Of course, the function of each module or unit may be realized in one or more software or hardware devices in the implementation of the disclosure.

It can be seen from the implementation that, compared with the conventional art, the technical solution provided by the disclosure performs original channel estimation according to the uplink signal received by a base station terminal array antenna, and suppresses the noise on a signal tap in the channel estimation by multi-antenna transform domain noise reduction, so as to improve the channel estimation precision and further to improve the whole performance of the multi-antenna system.

Those skilled in the art should understand that the embodiments of the disclosure can be provided as method, system or computer program product. Therefore, the disclosure can be in the form of complete hardware embodiment, complete software embodiment or hardware and software combined embodiment. Moreover, the disclosure can be in the form of computer program product implemented on one or more computer available storage media (including, but not limited to, disk memory, CD-ROM and optical memory) having computer available program codes.

The disclosure is described with reference to the flowchart and/or block diagram of the method, apparatus (system) and computer program product according to the embodiments of the disclosure. It should be understood that every flow and/or block in the flowchart and/or block diagram, and the combination of flow and/or block in the flowchart and/or block diagram can be implemented by the computer program instructions. Such computer program instructions can be provided to the processor of general computer, dedicated computer, embedded processing unit or other programmable data processing apparatus to generate a machine, so that the instructions executed by the processor of computer or other programmable data processing apparatus can generate a device used for implementing the functions specified in one or more flows in the flowchart and/or one or more blocks in the block diagram.

These computer program instructions can also be stored in the computer readable memories capable of booting computer or other programmable data processing apparatus to function in specified modes, so that they generate a product having an instruction device which implements the functions specified in one or more flows in the flowchart and/or one or more blocks in the block diagram.

These computer program instructions can also be loaded in a computer or other programmable data processing apparatus to execute a series of operating steps thereon to generate a processing implemented by the computer, so that such instructions executed in the computer or other programmable data processing apparatus provide the steps for implementing the functions specified in one or more flows in the flowchart and/or one or more blocks in the block diagram.

Although the preferred embodiments of the disclosure have been described, other alterations and modifications can be made for these embodiments by those skilled in the art once they find the basic creative concepts. Therefore, the appended claims are intended to explain as all alterations and modifications including the preferred embodiments and falling within the scope of the disclosure.

Obviously, various modifications and variations for the disclosure can be made by those skilled in the art within the spirit and scope of the disclosure. By doing so, if such modifications and variations of the disclosure are in the scope of the claims and equivalents thereof, the disclosure is intended to fall within such modifications and variations.

What is claimed is:

1. A channel estimation method in a multi-antenna system, comprising:
    for each uplink user received by a base station array antenna, obtaining an original channel estimation value for each array element of the array antenna;
    generating a channel estimation matrix using the obtained original channel estimation values, wherein the channel estimation values associated with each array element form a respective row vector of the channel estimation matrix, and the channel estimation values of respective array elements corresponding to a location of each channel estimation tap form a respective column vector of the channel estimation matrix;
    dividing the channel estimation matrix into a channel estimation amplitude matrix and a channel estimation phase matrix;
    grouping, in the channel estimation amplitude matrix, the channel estimation values associated with the respective array elements at one corresponding tap location together for signal transformation processing;
    applying a transform-domain noise reduction to a high-frequency portion of transform-domain data obtained by the signal transformation processing;
    obtaining a noise-reduced channel estimation amplitude matrix by applying an inverse transform to the noise-reduced transform domain data; and
    combining the noise-reduced channel estimation amplitude matrix with the channel estimation phase matrix into a restored channel estimation matrix, wherein the amplitude of each channel estimation value of the restored channel estimation matrix has undertaken a multi-antenna transform domain noise reduction process.

2. The method according to claim 1, further comprising:
    applying a channel estimation power threshold postprocessing to a tap power of a respective channel estimation value of the restored channel estimation matrix.

3. The method according to claim 2, wherein applying a transform domain noise reduction to a high-frequency portion of transform domain data obtained by the signal transformation processing further includes setting the high-frequency portion of the transform domain data to zero.

4. The method according to claim 3, wherein setting high-frequency portion of the transform domain data to zero further includes: setting the elements in the last m rows of the transform domain data to zero, wherein m is less than a sum of the antennas and obtained through simulation.

5. The method according to claim 2, wherein the signal transformation processing is one selected from the group consisting of: Discrete Fourier Transformation (OFT), Discrete Cosine Transformation (DCT) and Discrete Wavelet Transformation (DWT).

6. The method according to claim 1, wherein applying a transform domain noise reduction to a high-frequency portion of transform domain data obtained by the signal transformation processing further includes setting the high-frequency portion of the transform domain data to zero.

7. The method according to claim 6, wherein setting high-frequency portion of the transform domain data to zero further includes: setting the elements in the last m rows of the transform domain data to zero, wherein m is less than a sum of the antennas and obtained through simulation.

8. The method according to claim 1, wherein the signal transformation processing is one selected from the group consisting of: Discrete Fourier Transformation (DFT), Discrete Cosine Transformation (DCT) and Discrete Wavelet Transformation (DWT).

9. A channel estimation device in a multi-antenna system, comprising:
    a matrix module which is configured to, for each uplink user received by a base station array antenna, first obtain an original channel estimation value for each array element of the array antenna, and then generate a channel estimation matrix using the obtained original channel estimation values, wherein the channel estimation values associated with each array element form a respective row vector of the channel estimation matrix, and the channel estimation values of respective array elements corresponding to a location of each channel estimation tap form a respective column vector of the channel estimation matrix;
    a dividing module which is configured to divide the channel estimation matrix into a channel estimation amplitude matrix and a channel estimation phase matrix;
    a transformation module which is configured to group, in the channel estimation amplitude matrix, the channel estimation values associated with the respective array elements at one corresponding tap location together for signal transformation processing;
    a noise reduction module which is configured to apply a transform domain noise reduction to a high-frequency portion of transform domain data obtained by the signal transformation processing;
    an inverse transformation module which is configured to obtain a noise-reduced channel estimation amplitude matrix by applying an inverse transform to the noise-reduced transform domain data; and
    a restoring module which is configured to combine the noise-reduced channel estimation amplitude matrix with the channel estimation phase matrix into a restored channel estimation matrix, wherein the amplitude of each channel estimation value of the restored channel estimation matrix has undertaken a multi-antenna transform domain noise reduction process.

10. The device according to claim 9, further comprising:
    a postprocessing module which is configured to apply a channel estimation power threshold postprocessing to a tap power of a respective channel estimation value of the restored channel estimation matrix.

11. The device according to claim 10, wherein the noise reduction module is further configured to set the high-frequency portion of the transform domain data to zero when applying the transform domain noise reduction to the high-frequency portion of the transform domain data.

12. The device according to claim 11, wherein the noise reduction module is further configured to set the elements in the last m rows of the transform domain data to zero, wherein m is less than a sum of the antennas and obtained through simulation.

13. The device according to claim 10, wherein the transformation module is further configured to perform a signal transformation processing selected from the group consisting of: Discrete Fourier Transformation (DFT), Discrete Cosine Transformation (DCT) and Discrete Wavelet Transformation (DWT).

14. The device according to claim 9, wherein the noise reduction module is further configured to set the high-frequency portion of the transform domain data to zero when applying the transform domain noise reduction to the high-frequency portion of the transform domain data.

15. The device according to claim 14, wherein the noise reduction module is further configured to set the elements in the last m rows of the transform domain data to zero, wherein m is less than a sum of the antennas and obtained through simulation.

16. The device according to claim 9, wherein the transformation module is further configured to perform a signal transformation processing selected from the group consisting of: Discrete Fourier Transformation (DFT), Discrete Cosine Transformation (DCT) and Discrete Wavelet Transformation (DWT).

* * * * *